United States Patent
Lyu et al.

(10) Patent No.: US 8,055,197 B2
(45) Date of Patent: Nov. 8, 2011

(54) APPARATUS AND METHOD FOR BLUETOOTH CONNECTION IN PORTABLE TERMINAL

(75) Inventors: Young-Suk Lyu, Yongin-si (KR); Sang-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 893 days.

(21) Appl. No.: 11/958,812

(22) Filed: Dec. 18, 2007

(65) Prior Publication Data
US 2008/0146151 A1 Jun. 19, 2008

(30) Foreign Application Priority Data
Dec. 18, 2006 (KR) .................. 10-2006-0129521

(51) Int. Cl.
*H04B 7/00* (2006.01)

(52) U.S. Cl. ...................... 455/41.3; 455/41.2
(58) Field of Classification Search ............... 455/41.2, 455/41.3, 517, 575.2, 569.1
See application file for complete search history.

(56) References Cited

U.S. PATENT DOCUMENTS

| 2002/0045424 A1* | 4/2002 | Lee ..................... 455/41 |
| 2005/0227724 A1* | 10/2005 | Tsai ..................... 455/525 |
| 2008/0013601 A1* | 1/2008 | Lind et al. ............. 375/140 |

* cited by examiner

*Primary Examiner* — Lewis West
(74) *Attorney, Agent, or Firm* — The Farrell Law Firm, P.C.

(57) ABSTRACT

Provided is an apparatus and method for connecting a Bluetooth portable terminal to a Bluetooth device closest to the Bluetooth portable terminal by measuring link qualities or Received Signal Strength Indications (RSSIs) of accessible Bluetooth devices to determine the closest Bluetooth device when a Bluetooth connection event occurs in the Bluetooth portable terminal.

15 Claims, 4 Drawing Sheets

APPARATUS AND METHOD FOR BLUETOOTH CONNECTION IN PORTABLE TERMINAL

PRIORITY

This application claims priority under 35 U.S.C. §119(a) to a Korean Patent Application filed in the Korean Intellectual Property Office on Dec. 18, 2006 and assigned Serial No. 2006-0129521, the contents of which are incorporated herein by reference.

BACKGROUND OF THE INVENTION

1. Field of the Invention

The present invention relates generally to an apparatus and method for Bluetooth connection in a portable terminal, and in particular, to an apparatus and method for connecting a Bluetooth® (hereinafter "Bluetooth") portable terminal to a Bluetooth device closest to the Bluetooth portable terminal when a Bluetooth connection event occurs in the Bluetooth portable terminal.

2. Description of the Related Art

Owing to the development of efficient and economical Bluetooth communication technology, more electronic devices are using Bluetooth modules. Bluetooth is a radio communication protocol for connecting various terminals and devices using an Industrial, Scientific, and Medical (ISM) band frequency of 2.4 GHz at a rate of 1 Mbps. A device including a Bluetooth module (i.e., a Bluetooth device) communicates with a neighboring Bluetooth device using a Bluetooth ratio frequency as follows. The Bluetooth device searches for neighboring Bluetooth devices and selects one of the searched Bluetooth devices. If authentication is required for a Bluetooth communication with the selected Bluetooth device, authentication procedures are performed by Bluetooth pairing. Then, the two Bluetooth devices communicate with each other. A general method of searching for accessible Bluetooth devices is described with respect to FIG. 1.

FIG. 1 is an exemplary view illustrating how a Bluetooth portable terminal 100 generally searches for neighboring Bluetooth devices.

In FIG. 1, the Bluetooth portable terminal 100 including a Bluetooth module searches for neighboring Bluetooth devices 120, 122, 124, and 126 and makes a list 102 of accessible Bluetooth devices using the search result. Then, a user of the Bluetooth portable terminal 100 selects one Bluetooth device from the list 102. When a number of Bluetooth devices are searched for as accessible Bluetooth devices, as in FIG. 1, it can be difficult for the user to select one of the Bluetooth devices. For example, a plurality of Bluetooth devices 120 and 122 having the same name can be searched for as accessible Bluetooth devices, and moreover, the name of the searched Bluetooth devices 120 and 122 can be a product model name that is not familiar to the user. In this case, it may be more difficult for the user to select one of the Bluetooth devices 120 and 122.

Conventional Bluetooth connection procedures are described with reference to FIG. 2, wherein a flowchart illustrating Bluetooth connection process between Bluetooth devices is shown.

In FIG. 2, in step 200, a Bluetooth device receives a Bluetooth connection request from a user. In step 202, the Bluetooth device searches for accessible Bluetooth devices by transmitting a Host Controller Interface (HCI) inquire signal as a connection request signal and receiving a response signal. In step 204, the Bluetooth device outputs a list of accessible Bluetooth devices. In step 206, a user selects one of the listed accessible Bluetooth devices. In step 208, the Bluetooth device connects to the selected Bluetooth device by Bluetooth pairing. In step 210, a Bluetooth service is provided to the user.

In step 206, the user selects one of the listed accessible Bluetooth devices. However, it may be difficult for the user to select one of the listed accessible Bluetooth devices due to the above-mentioned problems. In general, users of Bluetooth portable terminals use a Bluetooth connection for connecting his/her Bluetooth portable terminal to other devices such as a Bluetooth headset, a Bluetooth headphone, a Bluetooth handsfree kit, or another Bluetooth portable terminal. In this case, most users may place a desired Bluetooth device close to their respective Bluetooth portable terminal and then try a Bluetooth connection between his/her Bluetooth portable terminal and the Bluetooth device.

Therefore, in addition to a conventional apparatus and method for connecting two Bluetooth devices by searching for neighboring Bluetooth devices and selecting one of the searched Bluetooth devices, there is a need for an apparatus and method for connecting the closest two Bluetooth devices.

SUMMARY OF THE INVENTION

An object of the present invention is to substantially solve at least the above problems and/or disadvantages and to provide at least the advantages below. Accordingly, one object of the present invention is to provide an apparatus and method for Bluetooth connection in a portable terminal.

Another aspect of the present invention is to provide an apparatus and method for connecting a Bluetooth portable terminal to a Bluetooth device closest to the Bluetooth portable terminal when a Bluetooth connection event occurs in the Bluetooth portable terminal.

Another aspect of the present invention is to provide an apparatus and method for connecting a Bluetooth portable terminal to a Class-2 Bluetooth device closest to the Bluetooth portable terminal when a Bluetooth connection event occurs in the Bluetooth portable terminal.

Another aspect of the present invention is to provide an apparatus and method for connecting a Bluetooth portable terminal to a Bluetooth device closest to the Bluetooth portable terminal by measuring link qualities or Received Signal Strength Indications (RSSIs) of accessible Bluetooth devices to determine the closest Bluetooth device when a Bluetooth connection event occurs in the Bluetooth portable terminal.

According to one aspect of the present invention, there is provided an apparatus for Bluetooth connection in a portable terminal. The apparatus includes a Bluetooth module transmitting a Bluetooth connection request signal and receiving a response signal for searching for accessible Bluetooth devices; a class selector checking classes of the accessible Bluetooth devices for selecting Class-2 accessible Bluetooth devices from the accessible Bluetooth devices and removing the remaining Bluetooth devices when a near Bluetooth connection request is received; a near device selector for selecting one of the Class-2 accessible Bluetooth devices closest to the portable terminal; and a Bluetooth connection processor transmitting the Bluetooth connection request signal through the Bluetooth module for searching for the accessible Bluetooth devices using the response signal to the Bluetooth connection request signal when the near Bluetooth connection request is received, the Bluetooth connection processor receiving information about the Class-2 Bluetooth devices from the class selector and information about the closest Bluetooth device from the near device selector for controlling a Bluetooth connection to the closest Bluetooth device.

According to another aspect of the present invention, there is provided an apparatus for Bluetooth connection in a portable terminal. The apparatus includes a Bluetooth module transmitting a Bluetooth connection request signal and receiving a response signal for searching for accessible Bluetooth devices; a near device selector for selecting one of the searched accessible Bluetooth devices closest to the portable terminal when a near Bluetooth connection request is received; and a Bluetooth connection processor transmitting the Bluetooth connection request signal through the Bluetooth module for searching for the accessible Bluetooth devices using the response signal to the Bluetooth connection request signal when the near Bluetooth connection request is received, the Bluetooth connection processor receiving information about the closest Bluetooth device from the near device selector for controlling a Bluetooth connection to the closest Bluetooth device.

According to yet another aspect of the present invention, there is provided a method for Bluetooth connection in a portable terminal. The method includes transmitting a Bluetooth connection request signal and receiving a response signal for searching for accessible Bluetooth devices when a near Bluetooth connection request is received; selecting Class-2 Bluetooth devices from the searched accessible Bluetooth devices; selecting one of the class-2 Bluetooth devices closest to the portable terminal; and connecting the portable terminal to the closest Bluetooth device.

According to still another aspect of the present invention, there is provided a method for Bluetooth connection in a portable terminal. The method includes transmitting a Bluetooth connection request signal and receiving a response signal for searching for accessible Bluetooth devices when a near Bluetooth connection request is received; selecting one of the accessible Bluetooth devices closest to the portable terminal; and connecting the portable terminal to the closest Bluetooth device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention relates to an apparatus and method for connecting a Bluetooth portable terminal to a Bluetooth device closest to the Bluetooth portable terminal upon a Bluetooth connection event generated in the Bluetooth portable terminal by searching for accessible Bluetooth devices and measuring link qualities or Received Signal Strength Indications (RSSIs) of the accessible Bluetooth devices so as to determine the closest Bluetooth device. The apparatus of the present invention is described below with reference to FIG. 3.

Figure 1:
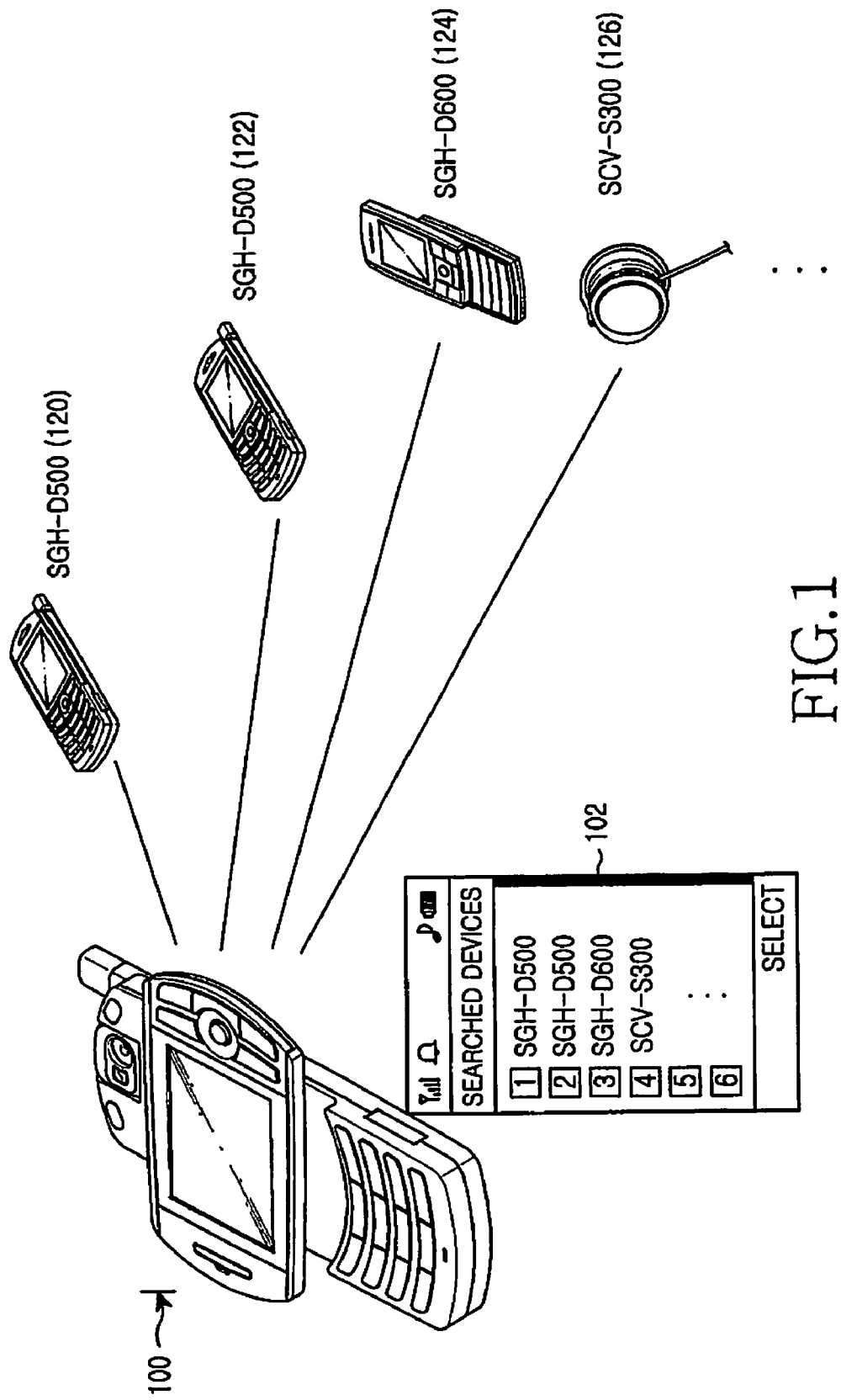
FIG. 1 is an exemplary view illustrating how a Bluetooth portable terminal searches for neighboring Bluetooth devices.
Figure 2:
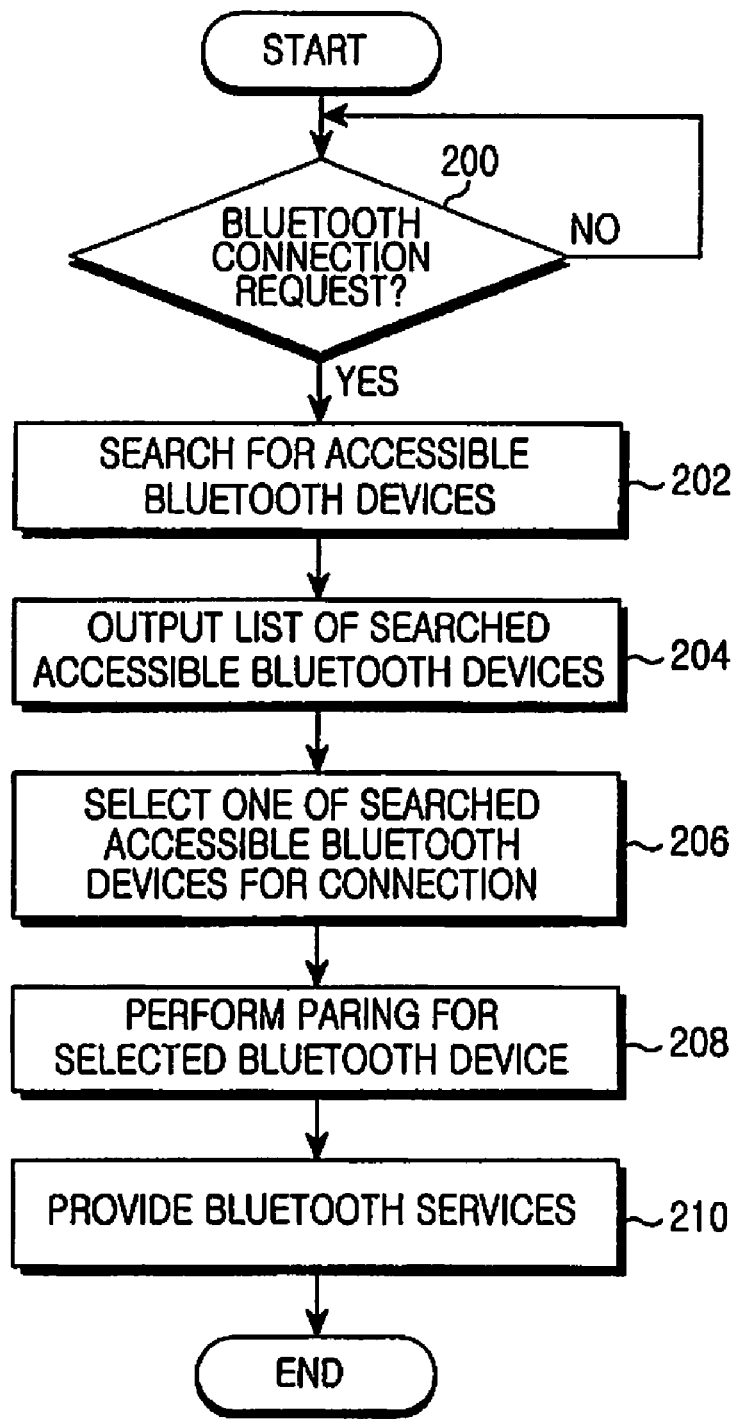
FIG. 2 is a flowchart illustrating a conventional Bluetooth connection process between Bluetooth devices.
Figure 3:
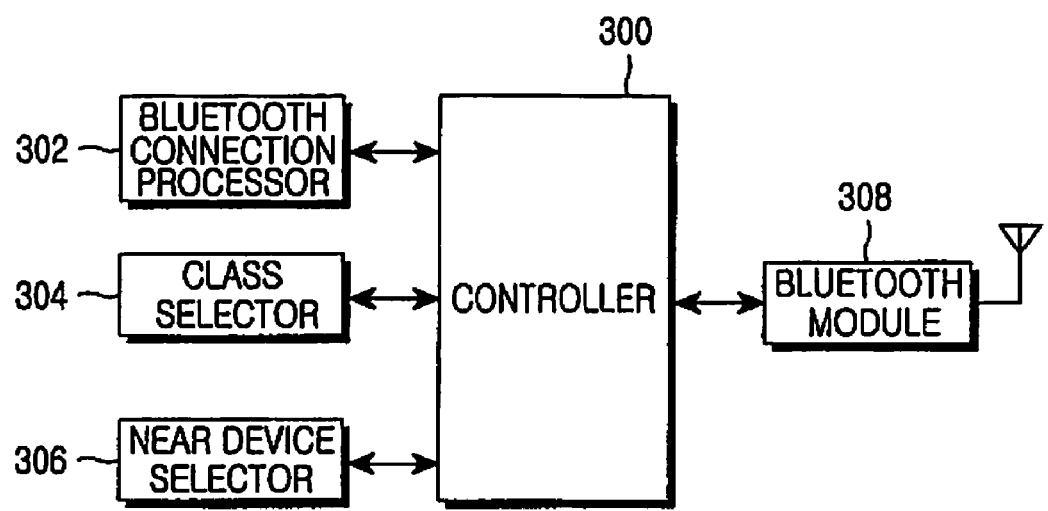
FIG. 3 illustrates a portable terminal capable of connecting to a closest Bluetooth device according to the present invention.

FIG. 3 illustrates a portable terminal capable of connecting to a closest Bluetooth device according to an embodiment of the present invention. In FIG. 3, the portable terminal of the present invention includes a controller 300, a Bluetooth connection processor 302, a class selector 304, a near device selector 306, and a Bluetooth module 308.

The Bluetooth module 308 searches for neighboring Bluetooth devices under the control of the controller 300 by transmitting a Host Controller Interface (HCI) inquire signal as a connection require signal and receiving a response signal including address and service information. Furthermore, the Bluetooth module 308 communicates with a Bluetooth device selected from the searched Bluetooth devices by a user under the control of the controller 300.

When a near Bluetooth connection request is received, the Bluetooth connection processor 302 transmits an HCI inquire signal through the Bluetooth module 308 and searches for accessible Bluetooth devices using a signal received in response to the HCI inquire signal. Then, the class selector 304 selects Bluetooth devices having a predetermined class from the searched accessible Bluetooth devices, and the near device selector 306 determines the closest Bluetooth device to the portable terminal from the selected Bluetooth devices. Thereafter, the Bluetooth connection processor 302 receives information about the closest Bluetooth device and connects to the closest Bluetooth device by Bluetooth pairing using the received information.

The class selector 304 selects Class-2 Bluetooth devices from the accessible Bluetooth devices searched by the Bluetooth connection processor 302 and removes the remaining Bluetooth devices.

Most Bluetooth devices accessible to a portable terminal are included in a Class-2, and it is difficult to select a Bluetooth device closest to a portable terminal from a group of Bluetooth devices in which both Class-1 and Class-2 Bluetooth devices are included since class-1 Bluetooth devices have a stronger output power than Class-2 Bluetooth devices. As a result, Bluetooth devices other than the Class-2 Bluetooth devices are removed from the accessible Bluetooth devices searched for by the Bluetooth connection processor 302.

According to Bluetooth specifications, Bluetooth devices are classified into three classes as illustrated in Table 1 below.

TABLE 1

| CLASS | DEVICES |
| --- | --- |
| CLASS 1 | Point-of-Sales systems. |
| | Bar code and RFID scanners. |
| | Medical measurement and data transfer systems. |
| | Automotive inspection and measurement systems. |
| | Telemetry and machine-to-machine interfaces. |
| | PDAs and other portable terminals. |
| | Industrial PCs and Laptops. |
| | USB dongles. |

TABLE 1-continued

| CLASS | DEVICES |
|---|---|
| CLASS 2 | Cellular phones.<br>Wireless headphones, headsets.<br>Automobile Hands-free kit. |
| CLASS 3 | — |

In Table 1, Bluetooth devices such as a Bluetooth headset, a Bluetooth headphone, a Bluetooth handsfree kit, and a Bluetooth portable terminal are included in Class-2. In general, when a Bluetooth device is connected to a portable terminal, the Bluetooth device and the portable terminal are first placed close to each other. Furthermore, in most cases, the Bluetooth device may be a Class-2 Bluetooth device. Therefore, according to the present invention, near Bluetooth connection is tried for Class-2 Bluetooth devices.

The near device selector 306 determines the closest Bluetooth device to the portable terminal from the Class-2 accessible Bluetooth devices selected by the class selector 304 using signals transmitted from the Class-2 accessible Bluetooth devices in response to the HCI inquire signal. Then, the near device selector 306 provides information about the closest Bluetooth device to the Bluetooth connection processor 302.

The near device selector 306 selects one of the Class-2 accessible Bluetooth devices having a highest link quality or a highest Received Signal Strength Indication (RSSI) and determines the selected Bluetooth device as the closest Bluetooth device to the portable terminal.

The link qualities and RSSIs of the Bluetooth devices are measured respectively using the "HCI_Read_Link_Quality" and "HCI_Read_RSSI" of the HCI commands defined by the "Bluetooth Specification Version 2.0+EDR" which is the specifications formalized by the Bluetooth Special Interest Group (SIG) in specified in November 2004, Version 2.0 (implementations feature Bluetooth Enhanced Data Rate (EDR) and reach 2.1 Mbit/s).

The controller 300 controls the Bluetooth connection processor 302, the class selector 304, and the near device selector 306. Alternatively, the controller 300 can perform the functions of the Bluetooth connection processor 302, the class selector 304, and the near device selector 306. In the current embodiment of the present invention, the controller 300, the Bluetooth connection processor 302, the class selector 304, and the near device selector 306 are separately provided. However, all or some of the Bluetooth connection processor 302, the class selector 304, and the near device selector 306 can be combined into the controller 300.

Figure 4:
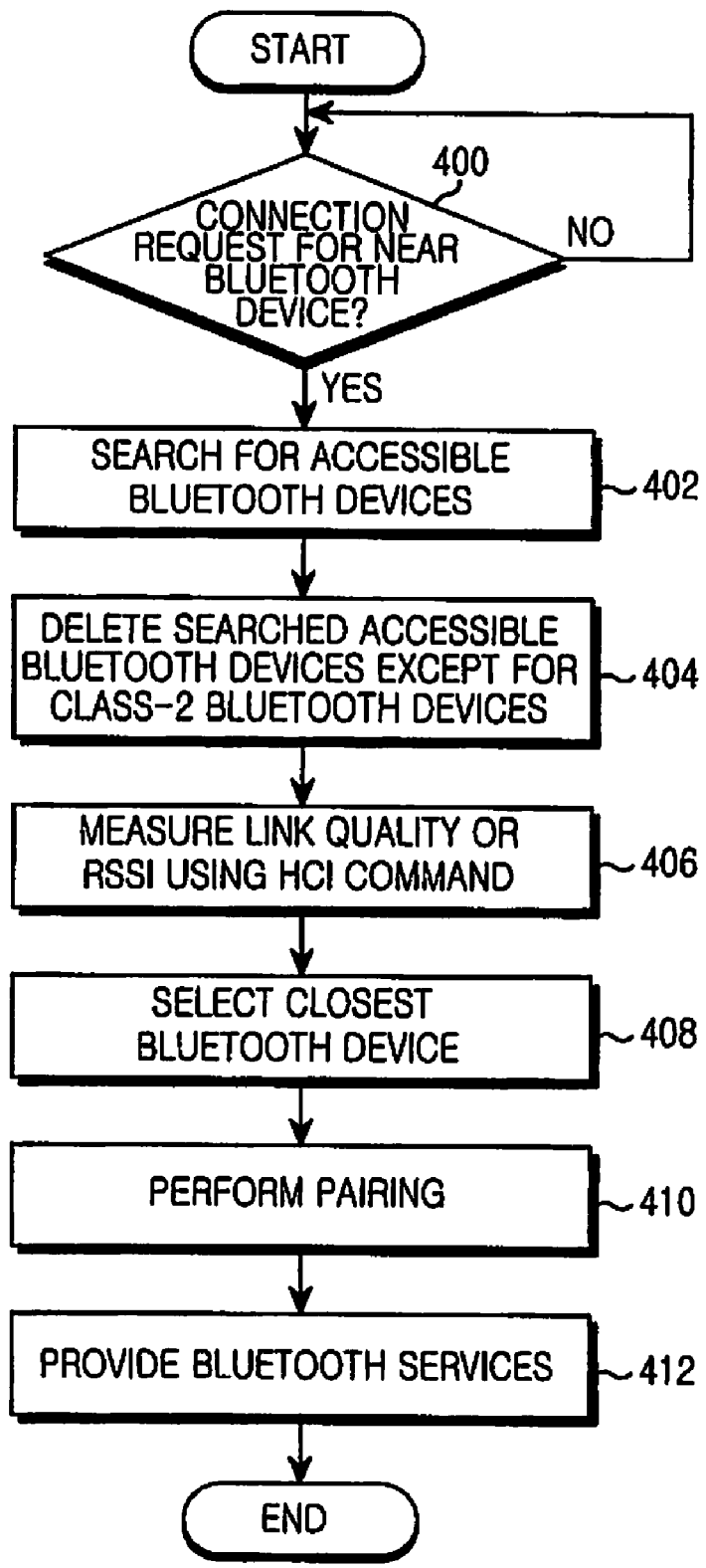
FIG. 4 is a flowchart for illustrating a method for searching for a Bluetooth device closest to a portable terminal and connecting the closest Bluetooth device to the portable terminal according to the present invention.

FIG. 4 is a flowchart for explaining a method for searching for a Bluetooth device closest to a portable terminal and connecting the closest Bluetooth device to the portable terminal according to the present invention.

In FIG. 4, in step 400, the portable terminal detects a request for Bluetooth connection to a close Bluetooth device. In step 402, the Bluetooth portable terminal searches for accessible Bluetooth devices by transmitting an HCI inquire signal as a connection request signal and receiving a response signal. In step 404, the portable terminal selects Class-2 Bluetooth devices from the searched accessible Bluetooth devices and removes the remaining Bluetooth devices. In step 406, the portable terminal measures the link qualities or the RSSIs of the Class-2 accessible Bluetooth devices. Here, the link qualities or the RSSIs can be measured using an HCI command defined by a Bluetooth specification.

In step 408, the portable terminal selects one of the Class-2 accessible Bluetooth devices having the highest link quality or RSSI and then determines the selected Class-2 accessible Bluetooth device as the closest accessible Bluetooth device to the portable terminal. In step 410, the portable terminal connects to the closest accessible Bluetooth device through a Bluetooth pairing process. In step 412, Bluetooth services between the portable terminal and the Bluetooth device are provided to a user.

As described above, the present invention relates to an apparatus and method for connecting a Bluetooth portable terminal to a Bluetooth device closest to the Bluetooth portable terminal upon a Bluetooth connection event generated in the Bluetooth portable terminal by searching for accessible Bluetooth devices and measuring link qualities or RSSIs of the accessible Bluetooth devices to determine the closest Bluetooth device. Therefore, the portable terminal can be automatically connected to the closest Bluetooth device, and thus, eliminating the need for users to check the names of each searched Bluetooth device when selecting one of the searched accessible Bluetooth devices, thereby allowing users to conveniently connect their portable terminals to these Bluetooth devices.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for Bluetooth connection in a portable terminal, the apparatus comprising:
   a Bluetooth module transmitting a Bluetooth connection request signal and receiving a response signal for searching for accessible Bluetooth devices;
   a class selector checking classes of the accessible Bluetooth devices for selecting Class-2 accessible Bluetooth devices from the accessible Bluetooth devices and removing the remaining Bluetooth devices when a near Bluetooth connection request is received;
   a near device selector for selecting one of the Class-2 accessible Bluetooth devices closest to the portable terminal; and
   a Bluetooth connection processor transmitting the Bluetooth connection request signal through the Bluetooth module for searching for the accessible Bluetooth devices using the response signal to the Bluetooth connection request signal when the near Bluetooth connection request is received, the Bluetooth connection processor receiving information about the Class-2 Bluetooth devices from the class selector and information about the closest Bluetooth device from the near device selector for controlling a Bluetooth connection to the closest Bluetooth device.

2. The apparatus of claim 1, wherein the Class-2 accessible Bluetooth devices include a Bluetooth headset, a Bluetooth headphone, a Bluetooth handsfree kit, and a Bluetooth portable terminal.

3. The apparatus of claim 1, wherein the near device selector finds out which of the Class-2 accessible Bluetooth devices has a highest link quality using the response signal to the Bluetooth connection request signal for determining the Bluetooth device having the highest link quality as the closest Bluetooth device.

4. The apparatus of claim 3, wherein the near device selector measures link qualities of the Class-2 accessible Bluetooth devices using an "HCI_Read_Link_Quality" defined by a Bluetooth specification.

5. The apparatus of claim 1, wherein the near device selector finds out which of the Class-2 accessible Bluetooth devices has a highest Received Signal Strength Indication (RSSI) using the response signal to the Bluetooth connection request signal for determining the Bluetooth device having the highest RSSI as the closest Bluetooth device.

6. The apparatus of claim 5, wherein the near device selector measures RSSIs of the Class-2 accessible Bluetooth devices using an "HCI_Read_RSSI" defined by a Bluetooth specification.

7. An apparatus for Bluetooth connection in a portable terminal, the apparatus comprising:
   a Bluetooth module transmitting a Bluetooth connection request signal and receiving a response signal for searching for accessible Bluetooth devices;
   a near device selector for selecting one of the searched accessible Bluetooth devices closest to the portable terminal when a near Bluetooth connection request is received; and
   a Bluetooth connection processor transmitting the Bluetooth connection request signal through the Bluetooth module for searching for the accessible Bluetooth devices using the response signal to the Bluetooth connection request signal when the near Bluetooth connection request is received, the Bluetooth connection processor receiving information about the closest Bluetooth device from the near device selector for controlling a Bluetooth connection to the closest Bluetooth device,
   wherein the near device selector finds out which of the searched accessible Bluetooth devices has a highest link quality using the response signal to the Bluetooth connection request signal for determining the Bluetooth device having the highest link quality as the closest Bluetooth device or finds out which of the searched accessible Bluetooth devices has a highest Received Signal Strength Indication (RSSI) using the response signal to the Bluetooth connection request signal for determining the Bluetooth device having the highest RSSI as the closest Bluetooth device.

8. A method for Bluetooth connection in a portable terminal, the method comprising the steps of:
   when a near Bluetooth connection request is received, transmitting a Bluetooth connection request signal and receiving a response signal for searching for accessible Bluetooth devices;
   selecting Class-2 Bluetooth devices from the searched accessible Bluetooth devices;
   selecting one of the Class-2 Bluetooth devices closest to the portable terminal; and
   connecting the portable terminal to the closest Bluetooth device.

9. The method of claim 8, wherein the Class-2 Bluetooth devices include a Bluetooth headset, a Bluetooth headphone, a Bluetooth handsfree kit, and a Bluetooth portable terminal.

10. The method of claim 8, wherein selecting one of the Class-2 Bluetooth devices closest to the portable terminal comprises finding out which of the Class-2 Bluetooth devices has a highest link quality using the response signal to the Bluetooth connection request signal for determining the Bluetooth device having the highest link quality as the closest Bluetooth device.

11. The method of claim 10, wherein selecting one of the Class-2 Bluetooth devices closest to the portable terminal further comprises measuring link qualities of the Class-2 Bluetooth devices using an "HCI_Read_Link_Quality" defined by a Bluetooth specification.

12. The method of claim 8, wherein selecting one of the Class-2 Bluetooth devices closest to the portable terminal further comprises finding out which of the Class-2 Bluetooth devices has a highest Received Signal Strength Indication (RSSI) using the response signal to the Bluetooth connection request signal for determining the Bluetooth device having the highest RSSI as the closest Bluetooth device.

13. The method of claim 12, wherein selecting one of the Class-2 Bluetooth devices closest to the portable terminal further comprises measuring RSSIs of the Class-2 Bluetooth devices using an "HCI_Read_RSSI" defined by a Bluetooth specification.

14. A method for Bluetooth connection in a portable terminal, the method comprising the steps of:
   when a near Bluetooth connection request is received, transmitting a Bluetooth connection request signal and receiving a response signal for searching for accessible Bluetooth devices;
   selecting one of the accessible Bluetooth devices closest to the portable terminal; and
   connecting the portable terminal to the closest Bluetooth devic;
   wherein selecting the one of the accessible Bluetooth devices closest to the portable terminal comprises one of:
      finding out which of the accessible Bluetooth devices has a highest link quality using the response signal to the Bluetooth connection request signal for determining the Bluetooth device having the highest link quality as the closest Bluetooth device and
      finding out which of the accessible Bluetooth devices has a highest Received Signal Strength Indication (RSSI) using the response signal to the Bluetooth connection request signal for determining the Bluetooth device having the highest RSSI as the closest Bluetooth device.

15. An apparatus for Bluetooth connection in a portable terminal, the apparatus comprising:
   means for receiving a response signal for searching for accessible Bluetooth devices in response to a Bluetooth connection request signal;
   means for selecting one of the accessible Bluetooth devices closest to the portable terminal; and
   means for connecting the portable terminal to the closest Bluetooth device,
   wherein the means for selecting one of the accessible Bluetooth devices closest to the portable terminal finds out which of searched accessible Bluetooth devices has a highest link quality using the response signal to the Bluetooth connection request signal for determining the Bluetooth device having the highest link quality as a closest Bluetooth device or finds out which of the searched accessible Bluetooth devices has a highest Received Signal Strength Indication (RSSI) using the response signal to the Bluetooth connection request signal for determining the Bluetooth device having the highest RSSI as the closest Bluetooth device.

* * * * *